United States Patent [19]

Chauvin et al.

[11] 4,235,024
[45] Nov. 25, 1980

[54] FLUIDIZED BED TREATMENT APPARATUS

[75] Inventors: Raymond Chauvin, Verneuil en Halatte; Pierre Guillon, Paris, both of France

[73] Assignee: Charbonnages de France, Paris, France

[21] Appl. No.: 962,805

[22] Filed: Nov. 21, 1978

[30] Foreign Application Priority Data

Nov. 22, 1977 [FR] France .................. 77 35034

[51] Int. Cl.³ .......................................... F26B 17/00
[52] U.S. Cl. ................... 34/57 A; 34/164; 118/DIG. 5; 427/185; 427/213
[58] Field of Search ............ 118/DIG. 5, 400, 421, 118/303; 34/57 A; 432/58; 422/143, 311; 209/466, 467, 469, 480; 427/185

[56] References Cited

U.S. PATENT DOCUMENTS

| 2,315,372 | 3/1943 | Kressman ............... 209/467 X |
| 2,740,698 | 4/1956 | Helwig .................. 34/57 A X |
| 2,944,009 | 7/1960 | Huntley et al. .......... 422/143 X |
| 3,138,483 | 6/1964 | Dettling et al. .......... 118/DIG. 5 |
| 3,250,643 | 5/1966 | Sergent ................. 118/DIG. 5 |
| 3,401,465 | 9/1968 | Lawill ................... 34/57 A |
| 3,746,516 | 7/1973 | Michaud ................ 432/58 X |
| 3,817,211 | 6/1974 | Brown et al. ............ 118/DIG. 5 |
| 3,982,900 | 9/1976 | Malgarini et al. ........ 422/143 |
| 4,057,605 | 11/1977 | Chauvin ................ 264/13 |
| 4,071,304 | 1/1978 | Chauvin ................ 427/185 |

FOREIGN PATENT DOCUMENTS 657454 9/1951 United Kingdom .
902720 8/1962 United Kingdom .
995494 6/1965 United Kingdom .

Primary Examiner—Shrive P. Beck
Attorney, Agent, or Firm—Cushman, Darby & Cushman

[57] ABSTRACT

An apparatus for producing a treatment bed with a fluidized, circulating medium comprises a fluidization container having intake means for a fluidization agent and means for vibration in the longitudinal direction comprises a fluidization grid consisting of a plate having a plurality of vents arranged in rows alternating with a plurality of rectilinear unvented strips, the strips being parallel to the vertical plane containing the direction of the vibrations.

3 Claims, 8 Drawing Figures

U.S. Patent Nov. 25, 1980 Sheet 1 of 2 4,235,024
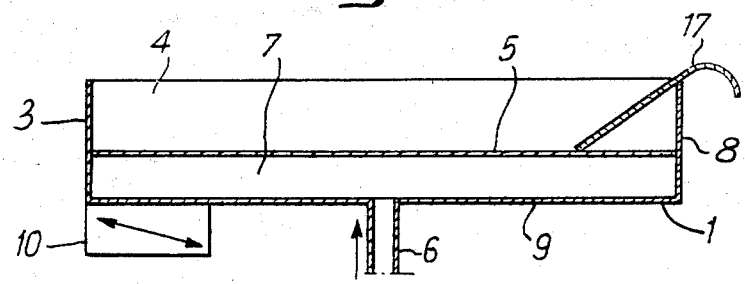
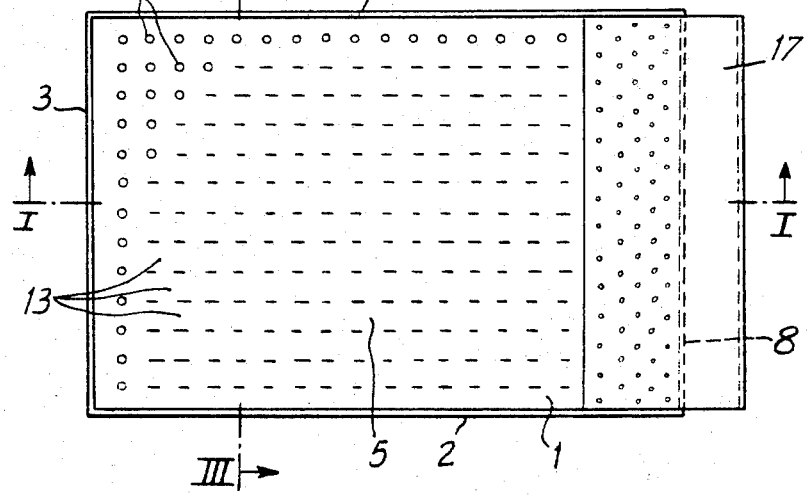
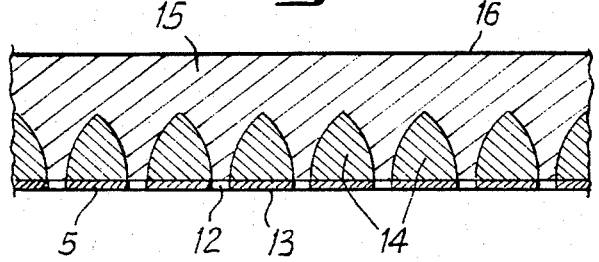

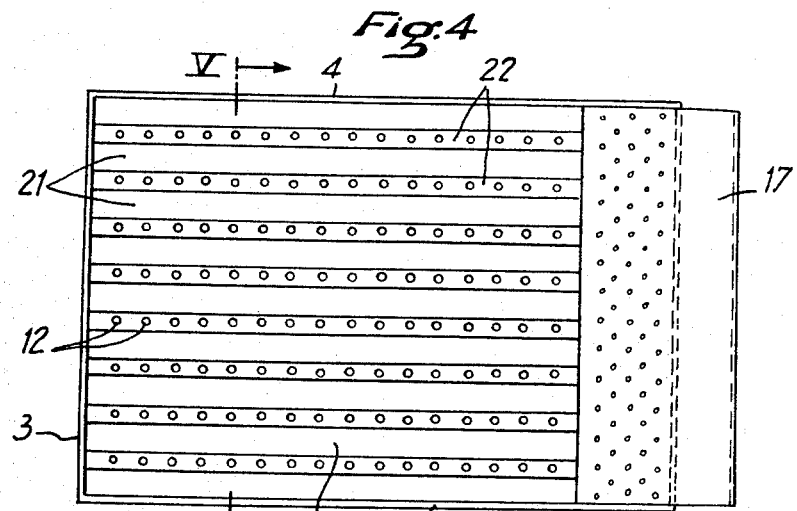
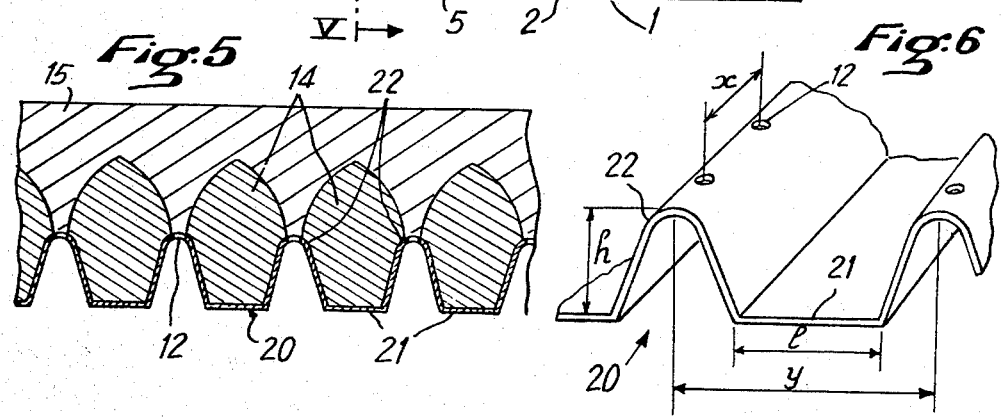
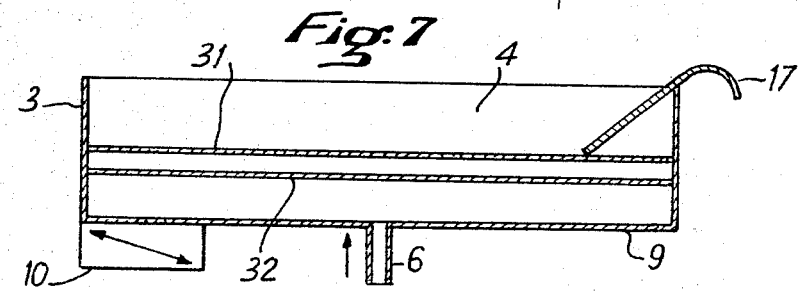
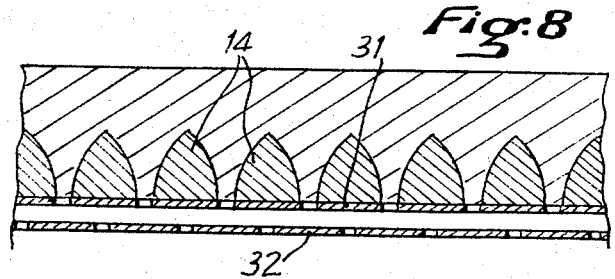

FLUIDIZED BED TREATMENT APPARATUS

BACKGROUND OF THE INVENTION

The invention relates to improved apparatus for the production of a treatment bed made up of solid particles to be partially submitted simultaneously to a fluidisation action and to an at least horizontal circulatory movement.

It is known to use fluidised beds of solid particles for carrying out various treatments of granular products, such as drying, coating, oxidation or firing; fluidised beds are also used in various granulation processes. In all these processes, it is desirable that the solid particulate product constituting the fluidised bed should be subjected to a circulatory movement which moves the granular products from one end of the fluidised bed where they are fed in to the other end where they are recovered. A circulation of this kind may be effected, for example, by using the process described in our French Pat. No. 2,238,532, by means of which the desired circulation can be obtained without the solid particles which constitute the fluidised bed leaving the apparatus. According to a particular embodiment of this process, a parallelepipedal enclosure is used which is subjected to vibrations and comprises two non-fluidised lateral zones. The vibrations set up circulating currents in these lateral zones, which transport the solid particulate products towards one of the ends of the fluidised bed, where the accumulation of these products causes a reverse circulation in the fluidised zones.

However, an apparatus of this kind has the disadvantage that it cannot be extended at will. In practice, there is a maximum width for the fluidised zone which must not be exceeded and, for apparatus of larger dimensions, a number of juxtaposed fluidised beds have to be used, which makes the apparatus more complicated and thus more expensive.

SUMMARY OF THE INVENTION

The aim of the invention is to provide an improved apparatus comprising a fluidised bed subjected to a circulatory movement and having the same advantages as the apparatus described in French Pat. No. 2,238,532, but capable of being extended at will to give any desired throughput.

The present invention provides apparatus for producing a treatment bed consisting of solid particles which are to be simultaneously subjected partly to a fluidisation action and to an at least horizontal circulatory movement, comprising a fluidisation container, with intake means and a distributor for the fluidisation agent which supplies only part of the bed, and means for setting up vibrations in the container, directing the vibrations in a substantially rectilinear manner at an angle of 0 to 80 degrees to the horizontal, wherein the fluidisation agent distributor consists of a plate comprising a plurality of vents arranged in rows alternating with a plurality of rectilinear unvented strips and the rows of vents and the strips are parallel to the vertical plane which contains the direction of the vibrations.

Preferably the plate which forms the distributor is substantially horizontal.

According to a preferred embodiment, the plate which constitutes the fluidisation agent distributor undulates at right angles to the direction of the rows of vents and masking strips, and the rows of vents are provided substantially at the top of the upper half-undulations, whilst the lower half-undulations may be flat-bottomed and be larger in their transverse dimensions than the upper half-undulations.

According to an alternative embodiment, a support plate having openings for the passage of the fluidisation agent, is mounted at a spacing below the distributor plate, the support plate having openings facing the unvented strips of the plate which constitute the distributor. The support plate may be fixedly mounted, with the distributor plate resting on the support plate in the absence of any intake of fluidisation agent.

The fluidised bed subjected to a circulatory movement obtained in the apparatus according to this invention can be used in all processes for drying, coating, firing, oxidising, etc of granular products. In particular, it may be used for the production of lightweight granular materials from silico-aluminous substances (schists, clays, etc) by the process described in our French Patent No. 2,214,667 or for the granulation, by solidification, of drops of products in liquid phase using the process described in our U.S. Pat. No. 4,071,304.

BRIEF DESCRIPTION OF THE DRAWINGS

FIG. 1 shows a longitudinal section along I in FIG. 2 through a first embodiment of the invention;

FIG. 2 shows a view of the apparatus in FIG. 1 from above;

FIG. 3 shows a cross section through the fluidisation grid of the apparatus along III in FIG. 2;

FIG. 4 shows a plan view of an apparatus which is a second embodiment of the invention;

FIG. 5 shows a cross section through the fluidisation grid of the apparatus according to V in FIG. 4;

FIG. 6 is a perspective view of a detail of the grid in FIG. 5;

FIG. 7 is a longitudinal section, analogous to that in FIG. 1, through a third embodiment of the invention;

FIG. 8 is a cross section, analogous to those in FIGS. 3 and 5, through the fluidisation grid of the apparatus in FIG. 7.

DESCRIPTION OF THE PREFERRED EMBODIMENT

The apparatus in FIGS. 1 to 3 comprises a fluidisation container 1 of generally planar rectangular form, having edges on at least three sides 2, 3, 4. This container also comprises a grid 5 which forms a distributor for a fluidisation agent such as air, for example, which is fed in, in the direction of the arrow, through a pipe 6 into a fluidisation chamber 7 which is bounded at the bottom by a leaktight wall 9 and at the top by the grid 5 and along its periphery by leaktight walls 2,3,4 which extend vertically above the grid 5, and by a wall 8 which extends vertically, in leaktight manner, at least so as to meet the grid 5. This apparatus will be referred to as the vibro-separator.

A vibrator 10 is mounted on one wall of the container so that it subjects it to vibrations in the direction indicated by the double arrow in FIG. 1, i.e. slightly inclined relative to the vertical and, in this case, in a plane corresponding to the plane of the drawing.

The grid 5 is a perforated plate mounted substantially horizontally and rigidly connected to the container 1, e.g. by being fixed to the walls 2,3,4 and 8. It comprises a plurality of rows 11 of perforations 12 acting as vents for the passage of the fluidisation agent from the chamber 7 towards the upper surface of the grid. The rows 11 of perforations 12 alternate with masking strips 13. The rows 11 and strips 13 extend longitudinally parallel to the sides 2 and 4 and to the plane in FIG. 1 which contains the vibrations. The direction of these vibrations will hereinafter be referred to as longitudinal.

If a bed of solid particles into which a granular material is introduced for treatment is placed on the grid 5, it is found that the fluidisation gas introduced through the holes 12 causes the formation of a fluidised zone 15 in the layer of solid particles, whilst between each row 11 of holes 12 a non-fluidised zone 14 appears in the vicinity of the plate 5 (FIG. 3). The surface 16 of the bed 15 is preferably completely fluidised, whilst for each type of solid particle this result is obtained by using a particular thickness which can readily be determined by experiments.

Under the effects of the vibrations caused by the vibrator 10, the material consisting of solid particles in the non-fluidised zones 14 moves longitudinally from the end 8 of the enclosure towards the end 3 (FIG. 1). This results in an accumulation of products near the end 3, which causes the material in the fluidised zone to flow from 3 towards 8. The granular products to be treated, which are introduced near the end 3, are drawn by this flow of material towards the end 8, where they are recovered by any known means. In particular, vibrating sieves 17 may be located near the end, in order to separate the granular products treated and discharge them outside the enclosure, whilst the solid particles constituting the fluidised bed pass through the sieves and remain inside the enclosure.

FIGS. 4 and 5 show another embodiment of the invention. The apparatus in FIGS. 4 and 5, as a whole, is of the same configuration as the apparatus in FIGS. 1 and 2, except for the construction of the grid.

The grid 20 undulates transversely according to the profile shown in FIG. 5, so that it forms alternate half-wave undulations 21 and 22. The undulations 22 form upward convex projections, when viewed from above, whereas undulations 21 form recesses or channels. The perforations 12 are provided substantially at the top of the undulations 22. In this way, a greater percentage of solid particles not subjected to fluidisation is obtained and the phenomena of fluidisation and conveying by vibration are made more stable.

FIG. 6 shows a precise example of an embodiment of a grid according to FIGS. 4 and 5.

For a bed measuring 1 m across and 0.70 m long, a grid 20 for distributing the fluidisation agent was provided, consisting of a corrugated steel sheet 0.6 mm thick with corrugating ribs arranged in the longitudinal direction of the bed. These ribs have flat bottoms 21 and rounded tops. The pitch y between two ribs is 16 mm, the width l of the flat bottom of each rib is 9 mm and the height h of the ribs is 7 mm. The holes 12 are 1 mm in diameter. They are arranged on top of the ribs at regular intervals x of 7 mm.

The vibro-separator is actuated by an electromagnetic vibrator, the system having a resonance frequency of approximately 51 Hz. The direction of the vibrations forms an angle of about 20° with the plane of the diffuser.

The fluidised phase is formed by a siliceous solid calibrated between 0.2 and 0.4 mm. To obtain correct fluidisation, the air speed is regulated to 0.1 m/s, based on the total empty section of the bed.

FIGS. 7 and 8 show another embodiment of the invention. The general structure is still the same as before, but the fluidisation agent distributor consists of two superimposed plates 31 and 32. The distributor plate proper 31 has the same general structure as the plate 5 in FIGS. 1 to 3, but it is mounted above a fixed support plate 32 which also has the same structure as the plate 31 but wherein the masking strips and the rows of perforations are offset relative to the corresponding strips in the plate 31.

The two plates are sufficiently near each other to form a subsidence slope beneath each hole in the plate 31, in the resting position, to prevent the powdered material from passing through the plate 32. During operation, the air pressure combined with the action of the vibrations removes all the powdery material above the plate 31.

We claim:

1. In an apparatus for producing a treatment bed consisting of solid particles which are simultaneously subjected partly to a fluidization action and to an at least horizontal circulatory movement therein, said apparatus comprising a fluidization container, intake means and a distributor for the fluidization agent which supplies only part of the bed, and means for setting up vibrations in the container in a substantially rectilinear manner at an angle of 0 to 80 degrees to the horizontal, the improvement wherein the fluidization agent distributor consists of a plate comprising a plurality of rows of upwardly directed vents arranged alternating with a plurality of rectilinear unvented strips, the rows of vents and the strips being parallel to the vertical plane in the direction of the vibrations, and wherein said plate is undulated at right angles to the direction of the rows of vents and the strips and rows of vents are positioned substantially at the top of the undulations, said apparatus, in operation, establishing therein non-fluidized zones of particles adjacent and rectilinear unvented strips, the balance of the particles being fluidized and said non-fluidized zones of particles moving longitudinally in a direction opposite said fluidized particles.

2. Apparatus according to claim 1, in which the lower half of the undulations are flat-bottomed and are larger in their transverse dimension than the upper half of the undulations.

3. Apparatus according to claim 1, in which the upper half of the undulations have a transverse profile in the form of an inverted V and the rows of vents are provided substantially at the apex of the V.

* * * * *